April 11, 1967 J. T. SAKATA 3,313,287
COMBINED FOOD COOKING AND SERVING ARRANGEMENT
Filed Sept. 27, 1965 2 Sheets-Sheet 1

INVENTOR
JAMES T. SAKATA

April 11, 1967 J. T. SAKATA 3,313,287
COMBINED FOOD COOKING AND SERVING ARRANGEMENT
Filed Sept. 27, 1965 2 Sheets-Sheet 2

INVENTOR
JAMES T. SAKATA

United States Patent Office 3,313,287
Patented Apr. 11, 1967

3,313,287
COMBINED FOOD COOKING AND SERVING
ARRANGEMENT
James T. Sakata, 1020 Kearny St.,
San Francisco, Calif. 94111
Filed Sept. 27, 1965, Ser. No. 490,557
6 Claims. (Cl. 126—216)

The present invention relates to food cooking and serving arrangements for restaurants and like establishments.

It is an object of the invention to provide a combined food cooking and serving arrangement that is compact, labor saving and easy to clean.

It is an other object of the invention to provide a combined food cooking and serving arrangement, of the type referred to, in which the food is kept warm as it is consumed, without requiring any other source of heat than the source of heat that is employed in its cooking.

These and other objects of the invention will be apparent from the following description of the accompanying drawings which illustrate a preferred embodiment thereof and wherein FIGURE 1 is a fragmentary perspective of an embodiment of the invention employing a brazier for cooking the food;

In accordance with the invention I provide externally along the top edge of a brazier a board or counter, and on the opposite side of the edge internally of the brazier along the edge of the cooking plate thereof, I provide a removable panel structure which has a horizontally disposed upper surface. This surface serves as the table surface for the customers and contains rows of depressed areas that have centrally located apertures which establish communication with the interior of the brazier. Into said depressed areas I place dished plates which are held in position by the rims of said depressed areas and are kept warm since their bottoms are exposed directly to the heat of the brazier through the apertures in said depressed areas. Thus, I provide individual plates for the customers, onto which food can easily be served by the cook from the centrally located cooking plate. As the food is consumed, these plates are kept warm and after the customer has finished his meal, they can easily be removed for cleaning. At the end of the day the entire plate-supporting panel structure may easily be lifted out of the brazier for cleaning. The whole arrangement is compact and can be attended to by a single operator who is both cook and waiter, and there is no possibility of delay in serving the food when it is ready.

Figures 1, 4:
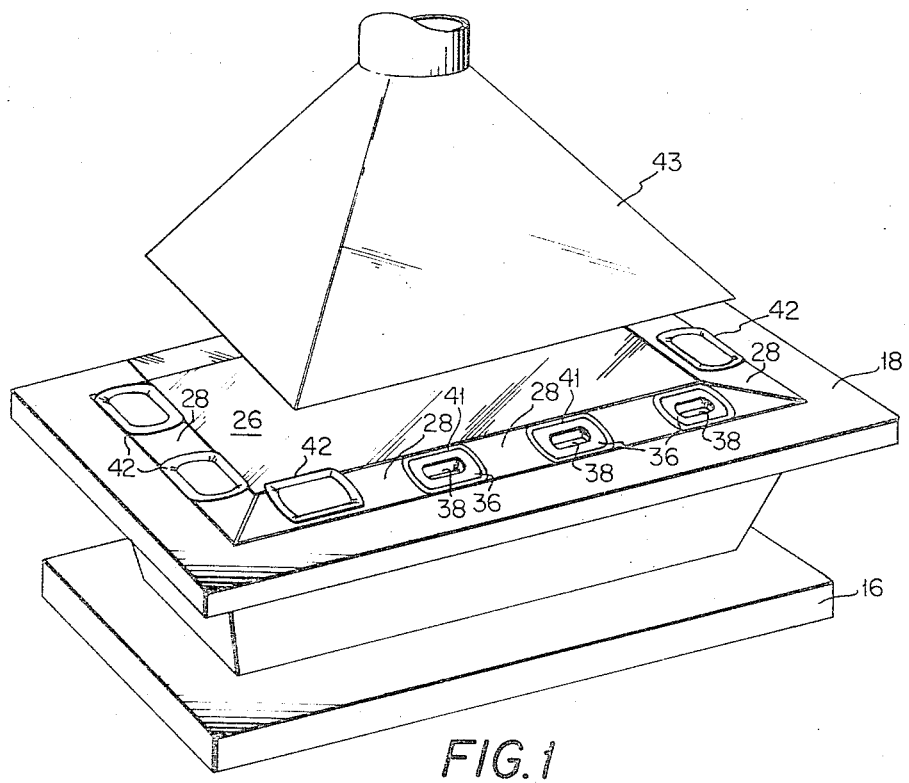
FIGURE 4 is an enlarged detail of FIGURE 3.
Figure 3:
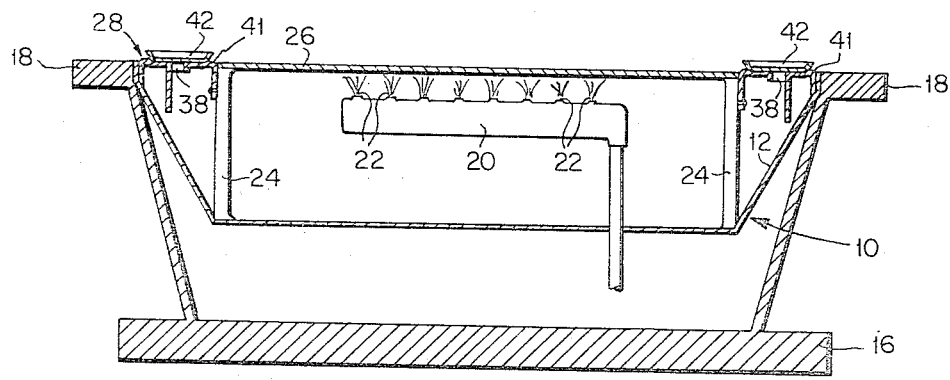
FIGURE 3 is a section taken along line 3—3 of FIGURE 2 and viewed in the direction of the arrows 3—3 associated with said line.

Having reference to FIGURES 1 and 3, the combined cooking and serving arrangement of the invention comprises a brazier or hibachi 10 which may be of cast iron. The brazier 10 may be of rectangular shape and have outwardly slanting side walls 12 that terminate in vertically disposed upper edge portions 14 (FIGURES 3 and 4). The brazier rests in a suitable base or pedestal 16 which may be of cradle shape and may be employed to provide heat insulation to protect the legs of customers seated around the brazier. Supported exteriorly adjacent three sides of the rectangular upper edge portion 14 of the brazier is a bar or counter 18 which may be made of a suitable heat-insulating material, such as wood. Arranged within the brazier is a source of heat, such as the horizontally disposed gas pipes 20 provided with relatively spaced jet openings 22, and supported above said gas pipes by means of four uprights or posts 24 is a horizontally disposed grill or cooking plate 26 which may be of metal. The cooking plate 26 is of lesser size than the open width of the brazier, and arranged in the space between the edges of the cooking plate and the three upper end edge portions of the brazier that are provided with counters, is a three-partite panel structure 28. Said panel structure has the cross-sectional contour of an inverted U, with one of the legs 30 of said U resting upon the inner surfaces of the reclining side walls 22 of the brazier and its opposite leg 32 resting upon studs 34 that may be provided on the posts or uprights 24 which support the cooking plate 26 (FIGURE 4). Due to the manner in which the panel structure is supported within the brazier, as described above, it may easily be lifted out of the brazier for cleaning.

Figure 2:
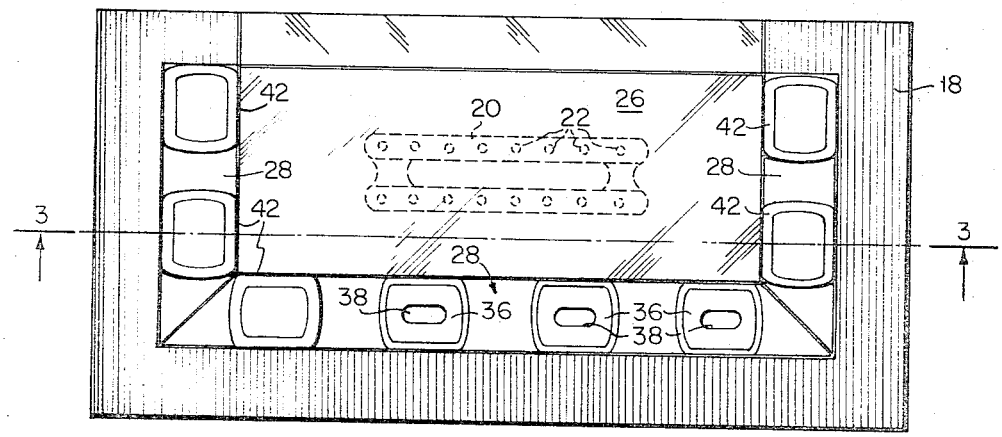
FIGURE 2 is a plan view of the arrangement shown in FIGURE 1, with the hood removed.

Provided in the upper surface of the panels are rows of depressed areas 36 of rounded rectangular contour (FIGURES 1 and 2), and each of said depressed areas has a centrally located aperture 38 provided with downwardly directed peripheral lips 40 which form a short flue. When the arrangement of the invention is in use, dished plates 42 of a size to fit into the depressions 36 are placed into, and are held in position by the rims 41 of said depressions and close the apertures 38, as shown in FIGURES 3 and 4. A ventilating hood 43 of conventional design may be suspended over the brazier as shown in FIGURE 1.

When the combined food cooking and serving arrangement of the invention is in use, the chef stands behind the edge of the brazier which is not provided with a plate-supporting panelling. When he has completed an order, he places it immediately upon the plate 42 before the waiting customer so that there is no possibility that the food may overcook or will become stale and cold as is frequently the case on service counters where it has to wait until it is picked up by the waiter. As the food is consumed, it is kept warm by the heat supplied to the bottom of the plate 42 through the aperture 38 in the depressed area 36 of the panelling. To increase this warming effect, the downwardly directed lips 40 around the apertures 38 may be extended on the sides remote from the center of the brazier to form aprons or baffle plates 44 that deflect the heat into the apertures 38. At the same time the baffle plates 44 operate to protect the side walls 12 of the brazier from excessive heat. When the customer has consumed his food and left the counter, his plate 42 is easily removed and replaced by a clean one. Hence, though several people sit closely together and eat from a common counter, the best rules of hygiene are observed. At the end of the day the entire panel structure 28 may easily be lifted from the brazier for cleaning.

The arrangement of the invention is space-saving, labor-saving and fuel-saving. It is compact and sanitary and makes it possible to serve cooked food when it is at its best. There is no danger that delays in serving the cooked food deteriorate its quality and irritate the customer.

While I have described my invention with the aid of a particular embodiment thereof, it will be understood that the invention is not limited to the specific constructional details shown by ways of example, which may be departed from without departing from the scope and spirit of the invention.

I claim:

1. A combined food cooking and serving arrangement comprising a brazier, a board arranged adjacent the upper edge of said brazier exteriorly thereof, a panel arranged adjacent said upper edge within said brazier, said panel having a horizontally disposed upper surface containing a number of depressions adapted to receive a dished plate, and a cooking plate supported adjacent said panel within said brazier.

2. A combined food cooking and serving arrangement according to claim 1 wherein said panel is detachably supported within said brazier.

3. A combined food cooking and serving arrangement according to claim 1 wherein the depressions in said panel contain apertures to establish communication with the interior of said brazier below said cooking plate.

4. A combined food cooking and serving arrangement according to claim 1 wherein said depressions contain apertures to establish communication with the interior of said brazier below said cooking plate and including an apron plate depending from said panel at the sides of the apertures thereof, remote from the interior of said brazier.

5. A combined food cooking and serving arrangement comprising a brazier having a vertically disposed upper edge portion of rectangular conformation, boards supported adjacent three sides of said rectangular edge portion externally of said brazier, a panel structure detachably supported adjacent said three sides within said brazier, said panel structure having a horizontally disposed upper surface containing a number of depressions adapted to hold serving plates, each of said depressions having a centrally located aperture establishing communication with the interior of said brazier, dished plates adapted to fit into said depressions and close said apertures thereof, and a cooking plate supported intermediately of said panel structure within said brazier.

6. A combined food cooking and serving arrangement according to claim 4 comprising aprons depending from said panel structure on the side of said apertures thereof remote from the interior of the brazier, to guide heat from the interior of the brazier toward said apertures and to the bottoms of the plates in said depressions.

References Cited by the Examiner

UNITED STATES PATENTS

| | | | |
|---|---|---|---|
| D. 131,939 | 4/1942 | Robinson | 126—25 X |
| 3,199,503 | 8/1965 | Hanson | 126—25 |

FREDERICK L. MATTESON, JR., *Primary Examiner.*

E. G. FAVORS, *Assistant Examiner.*